Feb. 17, 1942. N. M. COUTY 2,273,394
ALARM FITTING
Filed Jan. 3, 1941
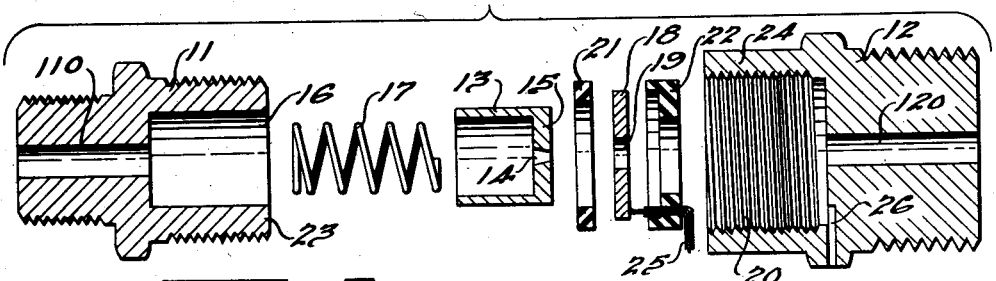
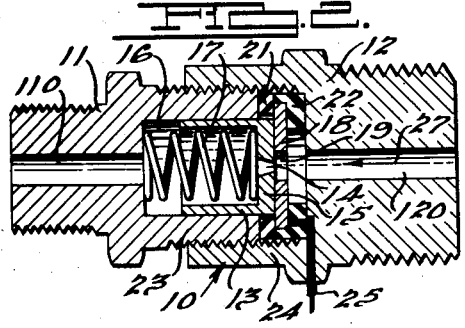
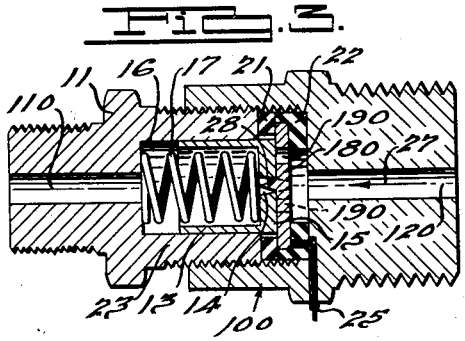
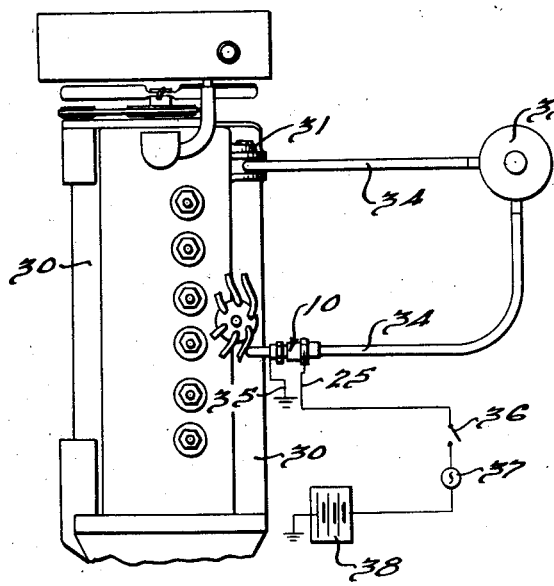
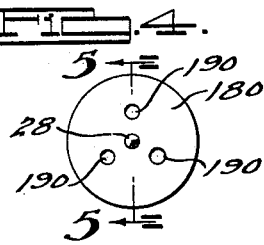
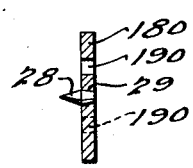
INVENTOR
Norman M. Couty.
BY
ATTORNEY Patented Feb. 17, 1942

2,273,394

UNITED STATES PATENT OFFICE 2,273,394

ALARM FITTING

Norman M. Couty, Detroit, Mich., assignor to The Flex-O-Tube Company, a corporation of Delaware Application January 3, 1941, Serial No. 373,043

2 Claims. (Cl. 200—82)

This invention relates to alarm fittings particularly adapted to indicate when a pre-determined pressure flow is not maintained through an oil line or the like.

In automotive engines and elsewhere, it is essential to maintain oil pressure in the forced lubrication systems thereof. When the oil filter generally employed in forced lubrication systems fails to function because of lack of cleaning or any portion of the pressure oil system of an automotive engine or the like clogs, much damage is apt to be done to engine parts from inadequate lubrication particularly when running at high speeds or under conditions of continuous operation at heavy loads.

Accordingly, the primary object of the invention is to provide a simple and inexpensive method and means as a part of the lubrication piping of an oil system of an internal combustion engine or the like for causing a visual or audible alarm to apprise the operator thereof of the fact that the oil system is not functioning properly before expensive damage is done to moving parts of the said engine or the like from lack of adequate lubrication.

Other objects of the invention will become apparent by reference to the following detailed description taken in connection with the accompanying drawing, in which:

Fig. 1 is an exploded longitudinal sectional view of an alarm fitting embodying the invention.

Fig. 2 is an assembled longitudinal sectional view of the construction disclosed in Fig. 1.

Fig. 3 is a longitudinal sectional view similar to Fig. 2 showing an alternate embodiment of the invention which is self-cleaning and nonclogging.

Fig. 4 is an elevational view showing the contact disc and cleaning element of the embodiment of the invention disclosed in Fig. 3.

Fig. 5 is a vertical sectional view taken on the line 5—5 of Fig. 4.

Fig. 6 is a more or less diagrammatic plan view of an internal combustion engine showing a preferred installation in the pressure lubrication system thereof of a method and means embodying the invention for giving alarm when the said lubrication system becomes clogged.

Referring now to the drawing wherein like numerals refer to like and corresponding parts throughout the several views and in particular to the embodiment of the invention disclosed in Figs. 1 and 2, the invention comprises an alarm fitting 10 composed of two oppositely disposed interconnected coupling members 11 and 12 having longitudinal passages 110 and 120 respectively therethrough, a piston 13 having an orifice 14 through the head 15 thereof fitted in a suitable bore 16 in one coupling member 11 which is constantly urged by a compression spring 17 against a contactor 18 having a central aperture 19 therethrough disposed within a bore 20 in the other coupling member 12 and held in insulated relationship to the coupling members 11 and 12 by insulating washers 21 and 22 respectively which serve simultaneously as a fluid seal between the externally threaded end 23 of the coupling member 11 and the internally threaded end 24 of the coupling member 12. An insulated electrical lead 25 is run through the aperture 26 in the coupling member 12 and through a suitable aperture provided in the washer 22 at which point the electrical lead 25 is soldered or otherwise permanently fixed to the contactor 18.

When the alarm fitting 10 is assembled as indicated in Fig. 2, the flow of fluid therethrough is in the direction of the arrow 27. It will be noted that the orifice 14 through the head 15 of the piston 13 is tapered with the smaller end thereof disposed at the outer surface of the head 15 of the said piston 13. This, in a measurable degree, prevents clogging of the said orifice 14. The strength of the compression spring 17 and the size of the orifice 14 in the head 15 of the piston 13 governs the pressure in a lubricant circulating system required to move the piston 13 out of contact with the contactor 18.

The embodiment of the invention 100 disclosed in Figs. 3, 4 and 5 is similar in every respect to the embodiment of the invention 10 disclosed in Figs. 1 and 2 hereinbefore described, except, however, the contactor 18 is replaced by a contactor 180 having a plurality of apertures 190 therethrough located off center rather than on center as in the case of the central aperture 19 through the contactor 18. Furthermore, the contactor 180 is provided with a centrally disposed conical protuberance 28 slightly smaller in diameter at its base than the orifice 14 through the head 15 of the piston 13 which projects through the said orifice 14 of the piston head 15 each time the piston head 15 approaches or makes contact with the contactor 18 whereby to constantly function as a cleaning element for the orifice 14. The said protuberance 28 preferably is formed of a nonconductive material and has a slightly tapered cylindrical stem 29 which is pressed tightly into a complementarily slightly tapered aperture provided to receive the same in the center of the said contactor 180 as best shown in Fig. 5.

As in the embodiment of the invention disclosed in Figs. 1 and 2, the strength of the compression spring 17 and the size of the orifice 14 in the head 15 of the piston 13 of the embodiment of the invention disclosed in Figs. 3, 4 and 5 govern the pressure in a lubricant circulating system required to move the piston 13 thereof out of contact with the contactor 180.

Fig. 5 discloses more or less diagrammatically a method of causing a visual alarm embodying the invention which indicates when oil is not being circulated properly through the lubrication system thereof. An engine 30 having an oil pump 31 which circulates oil from the crank case of the engine through an oil line 32, to and through an oil filter 33 through an oil line 34 connected to an alarm fitting 10 which in turn is threaded into the engine casting 30 at a point where oil under pressure is distributed through suitable bores and oil lines to points requiring lubrication.

The alarm fitting 10 is suitably grounded as indicated by the numeral 35, the insulated lead 25 therefrom is carried through the ignition switch 36 of the engine 30 to and through a light bulb 37 or other alarm means to a battery 38 which is grounded as indicated by the numeral 39, as best shown in Fig. 6.

Oil flowing through the lubricating system of the internal combustion engine 30 under normal pressure for which the compression spring 17 and orifice 14 of the piston head 15 of the alarm fitting is designed maintains the piston head 15 off the contactor 18 thereof and keeps the alarm circuits hereinbefore described open unless the oil in the lubricating system is circulated at a pressure below that which the alarm fitting is designed, in which event, the piston head 15 contacts the contactor 18 and causes the alarm signal light 37 or the like to become illuminated or sound, as the case may be.

Obviously, when the ignition switch 36 is turned off and the engine 30 stops running, the alarm signal 37 actuated by the closing of the alarm circuit by the alarm fitting 10 does not function.

Although but a single embodiment of the invention has been disclosed and described in detail, it is to be understood that many changes in the size, shape, arrangement and detail of the various parts thereof may be made and that the novel method employed to accomplish the desired results may be altered, all without departing from the spirit of the invention, and it is not intended to limit the scope of the invention other than by the terms of the appended claims.

I claim:

1. An alarm fitting comprising two oppositely disposed interconnected coupling members each having a longitudinal passage therethrough, one coupling member being externally threaded and having a cylinder formed therein communicating with the longitudinal bore therethrough, a piston reciprocatingly fitted in said cylinder having an orifice in the head thereof, the other coupling member being internally threaded to accommodate the first-mentioned coupling member, a contact member fitted in insulated relationship within said second-mentioned coupling member including an electrical lead therefrom insulated with respect to the said second coupling member, the said contact member being disposed to be contacted by said piston, spring means normally urging said piston into contact with said contact member, the compressive strength of said spring means and the size of the orifice through said piston being such as to establish a pre-determined pressure flow through said fitting required to separate said contact and said piston therefor.

2. An alarm fitting comprising two oppositely disposed interconnected coupling members each having a longitudinal passage therethrough, one coupling member being externally threaded and having a cylinder formed therein communicating with the longitudinal bore therethrough, a piston reciprocatingly fitted in said cylinder having a tapered orifice in the head thereof smaller at the face of the piston head than at the bottom of said head, the other coupling member being internally threaded to accommodate the first-mentioned coupling member, a contact member fitted in insulated relationship within said second-mentioned coupling member including an electrical lead therefrom insulated with respect to the said second coupling member, the said contact member being disposed to be contacted by said piston head, a protuberance on said contact member extending through said orifice when said piston comes into contact with said contact member, spring means normally urging said piston into contact with said contact member, the compressive strength of said spring means and the size of the orifice through said piston being such as to establish a pre-determined pressure flow through said fitting required to separate said contact and said piston therefor.

NORMAN M. COUTY.